United States Patent [19]

Nourry et al.

[11] Patent Number: 5,594,212
[45] Date of Patent: Jan. 14, 1997

[54] COUPLING DEVICE FOR ELECTRICAL TRUNKING

[75] Inventors: Daniel Nourry, Dijon; Gérard Jego, Brazey En Plaine; Jean-Pierre Thierry, Couternon, all of France

[73] Assignee: Schneider Electric SA, Boulogne-Billancourt, France

[21] Appl. No.: 500,754

[22] Filed: Jul. 11, 1995

[30] Foreign Application Priority Data

Jul. 12, 1994 [FR] France .................. 94 08789

[51] Int. Cl.⁶ .................................................. H01R 4/38
[52] U.S. Cl. .................. 174/88 R; 174/84 R; 174/92
[58] Field of Search .................. 174/84 R, 88 R, 174/92, 35, 50.52, 50.53, 50.54, 59, 60, 61, 64; 228/101; 439/152, 153, 201, 208, 210, 521, 542

[56] References Cited

U.S. PATENT DOCUMENTS

| | | | |
|---|---|---|---|
| 3,562,402 | 2/1971 | Dwyer | 174/35 |
| 3,831,130 | 8/1974 | Valtonen | 339/21 R |
| 4,186,986 | 2/1980 | Shoemaker | 339/114 |
| 4,493,525 | 1/1985 | Hall et al. | 339/143 R |
| 4,614,399 | 9/1986 | Gemra et al. | 339/205 |
| 4,810,829 | 3/1989 | Rutenbeck et al. | 174/41 |
| 4,964,815 | 8/1990 | Kawai et al. | 439/610 |
| 5,266,044 | 11/1993 | Whitney et al. | 439/210 |
| 5,415,558 | 5/1995 | Baker | 439/210 |

FOREIGN PATENT DOCUMENTS

0409807A2  1/1991  European Pat. Off. .
7501166    8/1976  Netherlands .

*Primary Examiner*—Marc D. Machtinger
*Attorney, Agent, or Firm*—Oblon, Spivak, McClelland, Maier & Neustadt, P.C.

[57] ABSTRACT

A coupling device for prefabricated electrical trunking. An internal member fits inside enclosure sections of the trunking which are to be butt-jointed. The internal member has water drainage grooves on its outer surface near a mating plane of the butt-joint. An exterior member fits over the joints and its two halves are bolted together.

7 Claims, 4 Drawing Sheets

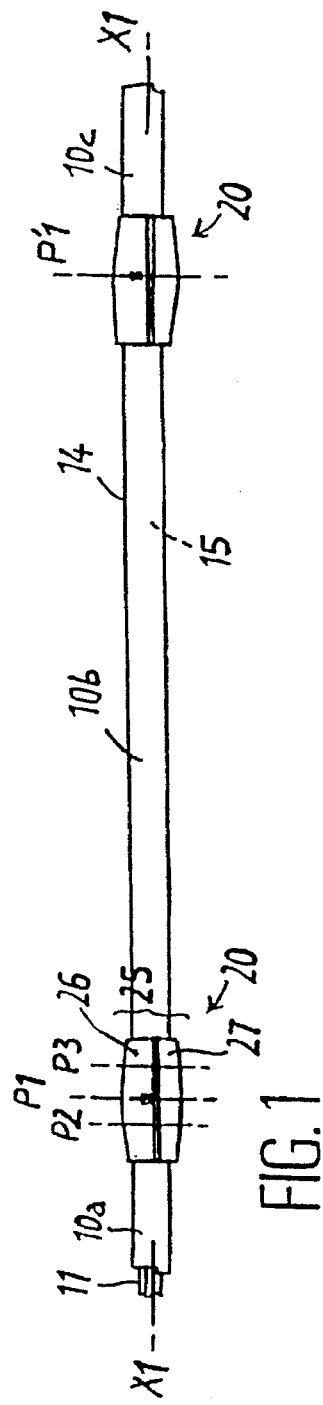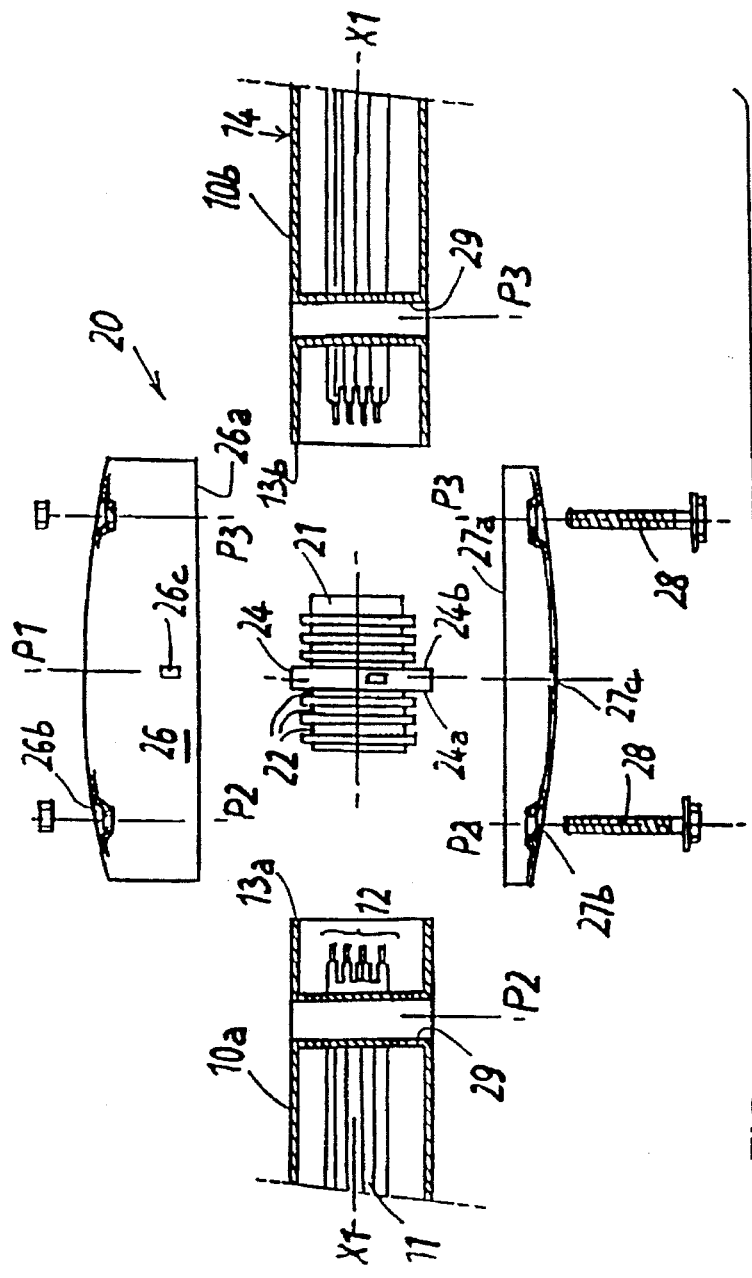
FIG. 1
FIG. 2

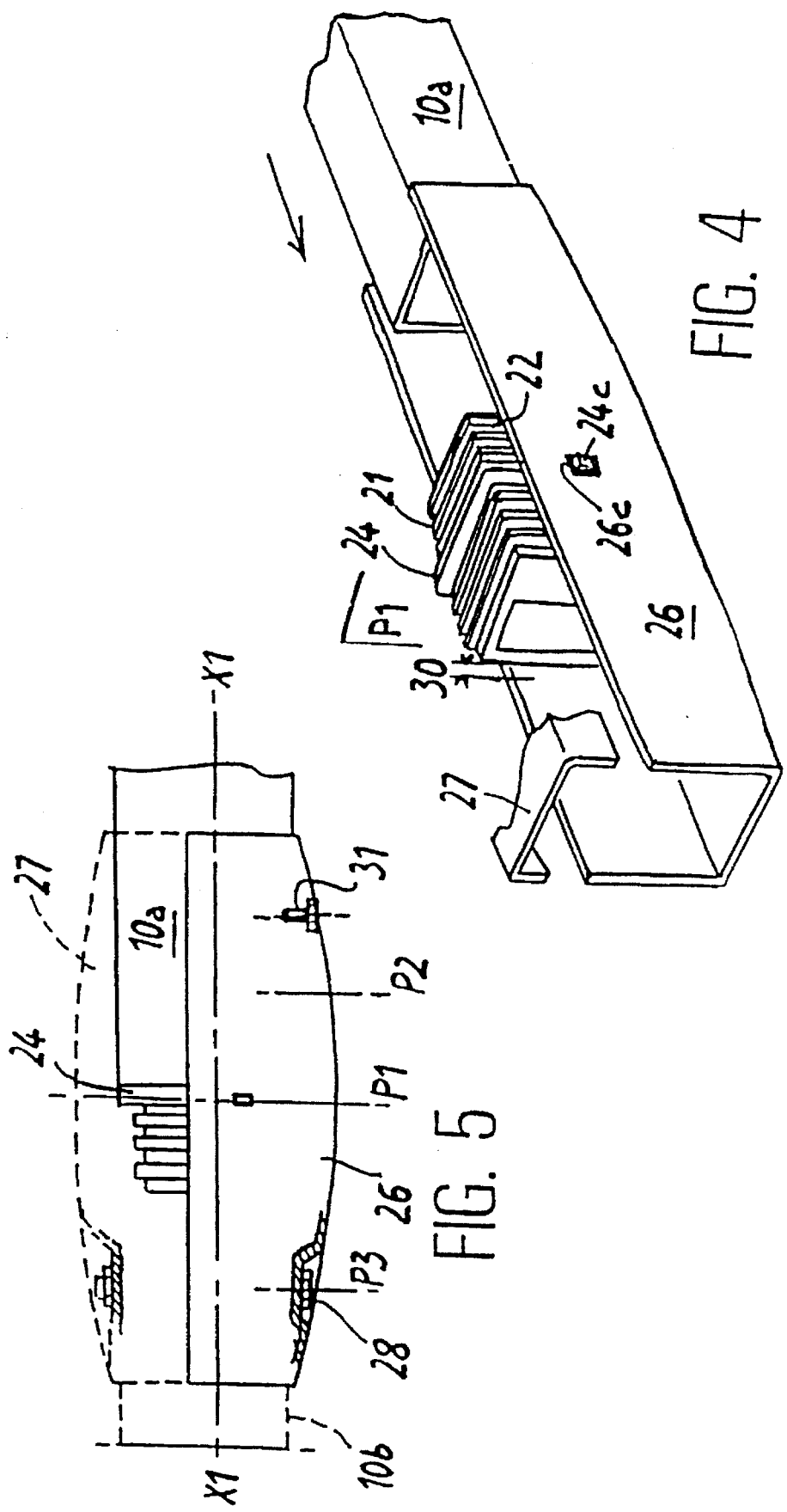

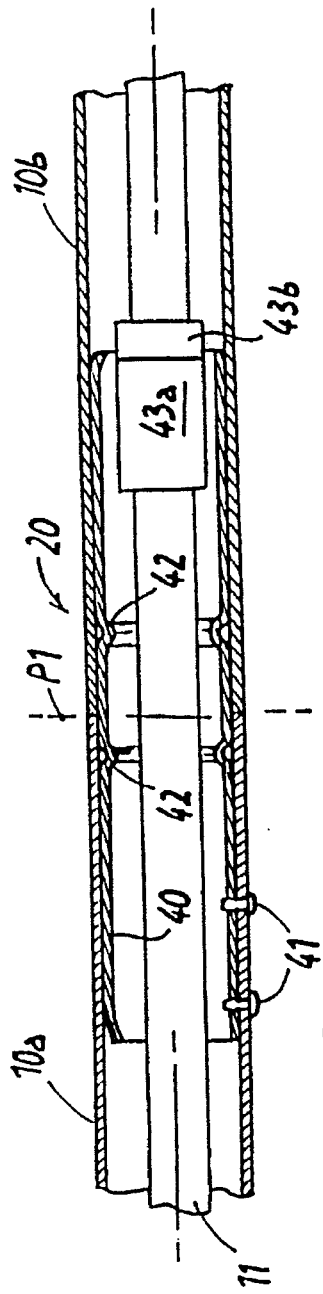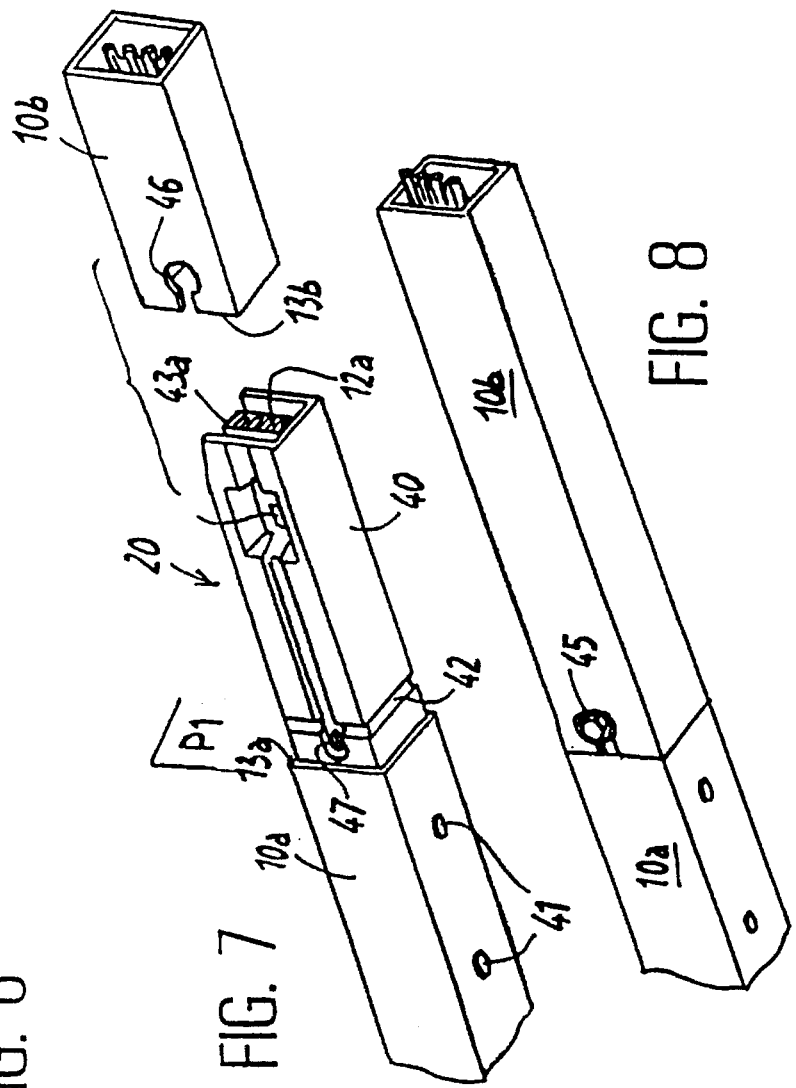

COUPLING DEVICE FOR ELECTRICAL TRUNKING

BACKGROUND OF THE INVENTION

The present invention concerns a coupling device for prefabricated electrical distribution trunking of the type constructed by butt-jointing a plurality of elongate sections of closed contour enclosure, each enclosure section accommodating a conductor assembly comprising mutually insulated parallel electrical conductors, the device comprising an internal member fitted inside the ends of two enclosure sections to be butt-jointed to attach them together mechanically.

DISCUSSION OF THE BACKGROUND

The electrical conductors contained in the trunking must be protected from water or condensation reaching their uncovered parts, especially in the area in which butt-jointed enclosure sections are fastened together by the coupling devices, sometimes known as fishplates.

An object of the invention is to improve the sealing of electrical trunking of the type defined hereinabove in the fishplate region.

In accordance with the invention, the internal member has water (or condensate) drainage grooves on its outside, located near a mating plane of the butt-jointed enclosure sections.

The internal member can be either an elongate sleeve previously inserted and fixed into one of the enclosure sections, with the bared ends of the conductors offset towards one end of the sleeve and at a distance from the drainage grooves, or a member having a central flange acting as a two-sided abutment for the enclosure sections and additionally forming an electrical interconnection member. The internal member can advantageously be associated with an external fishplate member covering the mating plane between the two enclosure sections.

BRIEF DESCRIPTION OF THE DRAWINGS

The following description is given with reference to the appended drawings in order to explain the features and the results of the invention.

FIG. 1 is a lateral view in elevation of electrical distribution trunking.

FIG. 2 is an exploded view of a fishplate device of the invention.

FIGS. 4 and 5 are respectively a perspective view and a side view of part of the inverted device.

FIG. 6 is a side view in section of an inverted variant embodiment of the device of the invention.

FIGS. 7 and 8 are perspective views of two stages in the assembly of the device from FIG. 6.

DISCUSSION OF THE PREFERRED EMBODIMENTS

Figure 3:
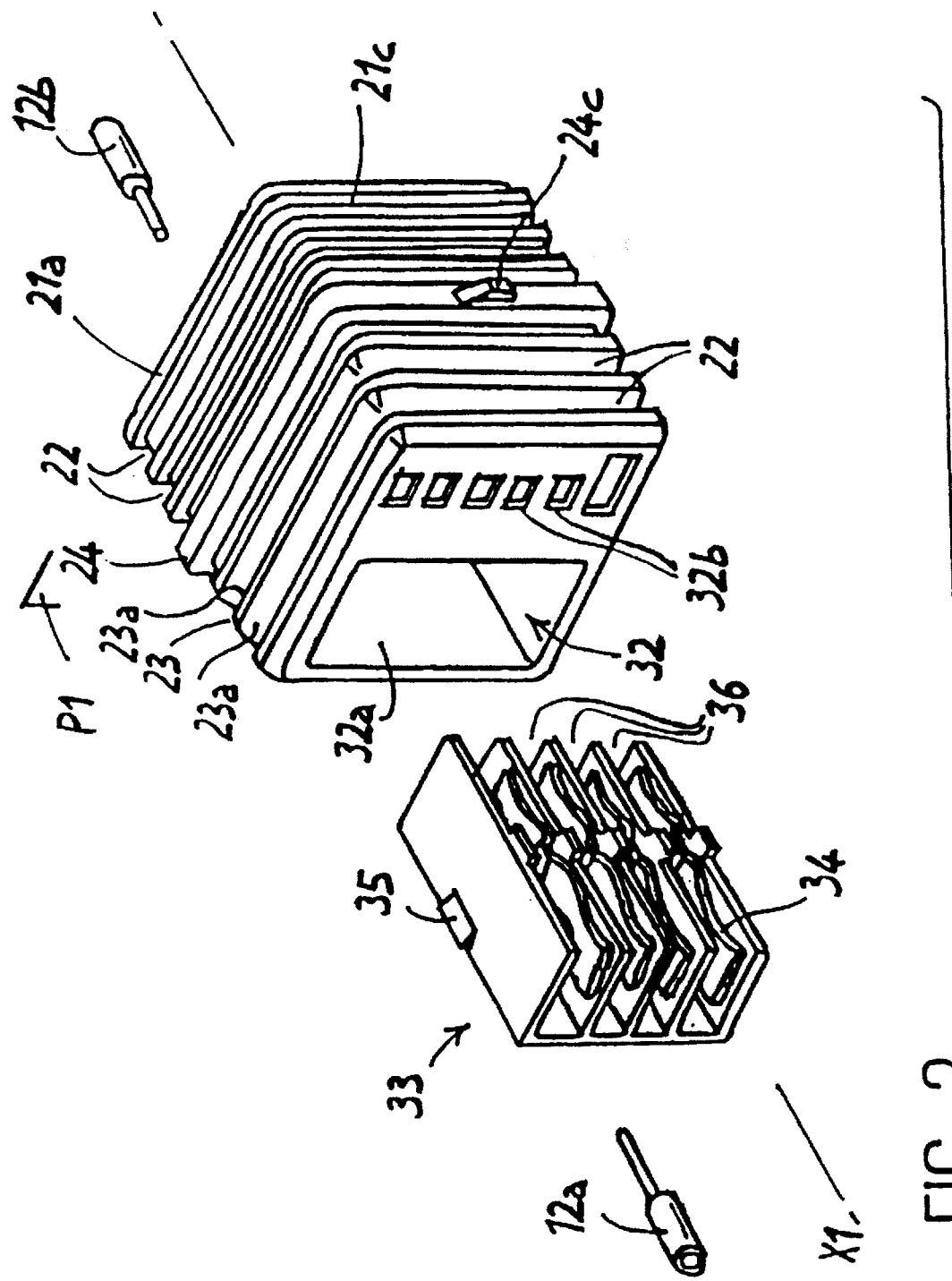
FIG. 3 is an exploded perspective view of an interior sleeve of the device from FIG. 2.

The prefabricated electrical distribution trunking shown in FIG. 1 comprises a plurality of closed contour enclosure sections 10a, 10b, 10c i.e. sections of tubular shape elongate along an axis X1. The enclosure accommodates one or two conductor assemblies 11 each comprising a plurality of parallel electrical conductors 12 see FIG. 2 in the form of independent conductors, busbars, cables or ribbon cables, the conductors having a length substantially equal to that of the enclosure sections. The enclosure sections 10a, 10b, 10c, etc are butt-jointed at the ends on planes P1, P'1, etc by fishplate devices 20 which ensure a rigid mechanical connection between two butt-jointed sections and interconnect their respective conductor assemblies.

In a first embodiment (FIGS. 2 through 5) the fishplate device 20 comprises a rectangular prism shaped internal member 21 inserted in the trunking; this member is centred on the mating plane P1 of the two butt-jointed enclosure sections 10a, 10b and fitted inside the ends of those sections.

In accordance with the invention, the internal member 21 is provided on its exterior, on each side of the plane P1, with water or condensate drainage grooves 22 in planes perpendicular to X1 and parallel to P1. The grooves are provided at least on the top face 21a and the side faces (not shown) 21c of the member 21 to collect and channel the water. The grooves 22 are flanked by ribs 23 having faces 23a facing the mating plane X1 that are perpendicular to X1; on the side facing away from the mating plane they have oblique faces (not shown) to facilitate insertion of the fishplate member 21 into the tubes 10a, 10b. The member 21 has a flange 24 in the middle, the flanks 24a, 24b of which provide abutments for the respective ends 13a, 13b of the enclosure sections 10a, 10b. The member 21 also has an electrical interconnect function explained below.

In combination with the member 21, the fishplate device 20 comprises a shell member 25 (see FIG. 1) which surrounds the exterior of the enclosure sections 10a, 10b on either side of the mating plane P1; it comprises two U-section half-shells 26, 27 attached together by bolts 28 and having contiguous longitudinal edges 26a, 27a parallel to X1; the half-shells have a convex profile to provide a fairing for the projecting parts of the bolts 28. The latter are passed vertically through holes 26b, 27b in the half-shells 26, 27 and vertical cylindrical spacers 29 with axes P2, P3 attached and sealed to the enclosure sections 10 near their ends. The U-section of the top half-shell 26 caps the top face 14 and most of the side faces 15 (see FIG. 1) of the tubular enclosure sections in the region of the mating plane P1, reducing the risk of water ingress via the mating plane P1. Likewise, water entering at the bolts 28 can flow through the inside of the spacers 29. Any water or condensate which nevertheless appears between the half-shells and the enclosure sections can drain through a nozzle 27c at the bottom of the bottom half-shell 27. Water or condensate infiltrating between the flanks 24a, 24b of the member 21 and the ends 13a, 13b of the sections is channelled by the grooves 22 on the member 21 into the bottom of the half-shell 27 via the bottom of the sections, which may be perforated.

Clip members 24c are provided on the member 21, for example on its central flange 24, to cooperate with holes 26c in the upper half-shell. The mechanical fishplate joint is therefore made in the following manner (see FIGS. 4 and 5): the member 21 is clipped into the top half-shell 26—shown inverted in FIGS. 4 and 5—and leaves at its perimeter, between the ribs 23 and the inside faces of the half-shell 26, a gap 30 for inserting the enclosure section 10a (see FIG. 4). The section 10a abutted against the flange 24 can then be fixed to the half-shell 26 by means of a fastening screw 31. The resulting subassembly is then ready to receive—as shown in dashed outline in FIG. 5—the section 10b, by movement in translation along X1 until it abuts against the flange 24. The half-shell 27 is then fitted and the bolts 28 are inserted in the spacers 29 and their nuts are screwed on to clamp the two half-shells together.

The member 21 also has an electrical connection function. To this end it comprises two longitudinal housings 32 on opposite ends oriented in the direction X1 and open on one side 32a to receive a member 33 carrying resilient contact clamps 34 and the conductors 12a of one of the sections 10a and on the other side 32b to receive the conductors 12b of the other section 10b. The members 33 in this embodiment are modules inserted and clipped by means 35 into the housings 32 (only one of which can be seen in FIG. 3); the body of each module is compartmented to provide the same number of housings 36 as the maximum number of conductors; the housings 36 are open laterally to receive the connecting clamps 34 when the interconnect subassembly is fitted. Note that the ribbon cable 11 of each section 10 is connected to the contact clamps 34 by means of a plug-in action when the internal member 21 is inserted in the corresponding section.

In the embodiment of FIGS. 6 through 8 the fishplate device 20 comprises an elongate U-section member 40 disposed inside the trunking and fixed to one enclosure section 10a, for example by rivets 41 underneath the enclosure, or by any equivalent means. The member 40 has on each side of the mating plane P1 between the two sections 10a, 10b a peripheral water or condensate drainage groove 42. Note that, in FIGS. 4 through 8, the trunking and its fishplate device are shown inverted, the required sealing being attained in the upright position shown in FIGS. 1 and 2, of course.

The ribbon cable 11 housed in the section 10a, (10b) is fitted at the end with a connector 43a (43b) held by clip means (not shown). The bared ends of the conductors 12a of the section 10a are near one end of the sleeve 40 at a distance from the drainage grooves 42. Before the enclosure sections are joined together, one of the grooves 42 is therefore concealed and the other showing. The enclosure section 10b is fitted over the mechanical member 40 until its end 13b abuts against the end 13a of the section 10a, and is then fixed to the section 10a by a screw 45; this screw passes through a hole 46 in the section 10b and enters a screw-threaded hole 47 in the member 40. The bottom of the section 10b optionally includes a drainage hole facing the visible groove 42.

We claim:

1. A coupling device for butt-jointing closed contour elongate enclosure sections of prefabricated electrical trunking, with each section housing a conductor assembly, said device comprising:

an internal member which is inserted into ends of two of said enclosure sections so as to fasten them together mechanically;

said internal member having water drainage grooves on its outer surface with the grooves being arranged near a mating plane between said enclosure sections.

2. The device according to claim 1, wherein the internal member is a sleeve and wherein ends of the conductor assembly of the enclosure sections to which the internal member is attached are arranged near opposite ends of the sleeve while the grooves are arranged at the center of the sleeve.

3. The device according to claim 1, wherein the internal member has a central external flange for abutting said two enclosure sections.

4. The device according to claim 1, wherein an external member forms a shell which covers the mating plane.

5. The device according to claim 4, wherein the internal member is clipped into the external member while leaving a gap therebetween for receiving the ends of said two enclosure sections.

6. The device according to claim 1, wherein the internal member has interior longitudinal housings for receiving electrical interconnect members on both sides of the mating plane and wherein said water drainage grooves are arranged on both sides of said mating plane.

7. The device according to claim 6, wherein each of said conductor assemblies is associated in the internal member with one of said housings into which is clipped one of said interconnect members, each said interconnect members having a body compartmented to provide the same number of housings as conductors and receiving in each housing a resilient connection clamp.

* * * * *